United States Patent
De Ment

[15] 3,641,354
[45] Feb. 8, 1972

[54] OPTICAL MODULATION BY FLUIDIC OPTICS UTILIZING CHROMATIC ABERRATION

[72] Inventor: Jack De Ment, 4847 Southeast Division St., Portland, Oreg. 97206

[22] Filed: Mar. 8, 1967

[21] Appl. No.: 621,658

[52] U.S. Cl. ............................. 250/216, 250/218, 350/161, 350/180
[51] Int. Cl. ............................................. H01j 3/14
[58] Field of Search ................. 350/161, 179, 180; 250/216, 250/218

[56] References Cited

UNITED STATES PATENTS

3,189,746  6/1965  Slobodin et al. ..................... 250/216

*Primary Examiner*—Walter Stolwein
*Assistant Examiner*—C. M. Leedom

[57] ABSTRACT

Optical modulation in the ultraviolet, visible and/or infrared spectrum, for a range of uses including optical computers, data-processing and optical information processing systems together with the transduction of gas and liquid fluidic signals and pressure transients to optical and electrical signals, a fluidic optic such as a transmission or reflection elastic lens which includes a fluid-oscillable elastic wall, typically a fluid-filled chamber having at least one elastic wall driven by alternating flow or pulse fluid oscillation means, optically coupled with a light source like a laser which generates at least two different wavelengths, and a sensor. The fluidic optic separates the wavelengths by chromatic aberration, and a stop between the optic and the sensor passes a given wavelength while blocking other wavelengths during a given oscillation mode. The oscillable wall of the fluidic optic can include an elastic or deformable image, diffraction grating, polarizer or hologram.

22 Claims, 9 Drawing Figures

OPTICAL MODULATION BY FLUIDIC OPTICS UTILIZING CHROMATIC ABERRATION

This invention relates to fluidic optics and fluidic optical systems for light modulation, sensing and recording embodying laser or incoherent light sources and light sensors disposed cooperantly with fluidic optics. In addition, in certain embodiments this invention relates to systems wherein there is provided the optical transduction of fluidic-to-electrical energies or of fluidic energy signals to sensed or recorded data.

The expression "fluidic optics" is here taken to mean typically an optic module or an ensemble of modules of the transmission or reflection kind which is characterized by a drumhead chamber having at least one elastic, flexible and resilient transparent or reflective window or plate which varies in sphericity with the application to fluid (liquid or gas) carried within the chamber of a positive or negative pressure or series of pressure pulses, resulting in such changes in optical properties as linear focal length, chromatic and axial aberration, and delivered irradiance. In short, a feature of this invention is an elastic lens or mirror which is characterized as responding to a pressure differential with changing sphericity and, hence, light is correspondingly and variously refracted or reflected by such an elastic optic. Modifications and variations of this illustrative fluidic optic are set out hereinafter.

Taking refraction at a spherical surface for descriptive purposes and using the elementary laws of optics: If $u$ = the distance of say a point source of light, $v$ = the distance of the image or sensor (or the intersection of the refracted ray with the axis), $n$ = the refractive index of the material comprising the spherical surface, and $r$ = the radius of curvature of the separating surface then for the surface in air:

$$n/v + 1/u = (n-1)/r$$

it is seen that by changing the value of $r$, and leaving the other values constant except for $v$, the value of $v$ will change. Likewise, for reflection from a spherical surface (mirror) in air:

$$1/u + v = 2/r$$

A convex lens behaves like a prism in that it deviates shorter wavelengths (e.g., blue) more than longer wavelengths (e.g., red); the same being true for the ultraviolet and the infrared portions of the spectrum. (The reverse is true for a concave lens). Here, the visible portion of the spectrum is used illustratively. Thus, for a fixed lens of the converging type the focal point of blue light will be nearer the lens than the focal point for red light, with intermediate wavelengths in between. Correspondingly, when lenses of different focal lengths (as in the case of a pulsating fluidic optic) are employed the spread off the optic axis (i.e., lateral spread, perpendicular spread or spread through a planar or solid angle off the axis) for a given color or wavelength will vary at a given point or plane along that optic axis. This of course is the well-known effect of chromatic aberration.

Included in this invention are coherent (laser) or incoherent light sources and appropriate electrical or nonelectrical sensors or recorders, with or without ancillary filters, optics, stops and the like.

It is an object of this invention to provide elastic and variably spheric optics which may, for example, have variable focal lengths.

It is an object of this invention to provide an optical system for light modulation, particularly that involving laser light.

It is an object of this invention to provide an optical system for differentially sensing and/or recording light, particularly laser light.

It is a further object of this invention to provide a fluidic optic system of variegated oscillatory powering means which relies upon chromatic aberration phenomena in combination with a stop between the optic and a sensor for passing one wavelength while blocking another wavelength during a given oscillation mode.

It is an object of this invention to provide optical transducers for fluidic-to-electric energies, as for binary logic, digital switching, information production and data banking, process control, and computer applications which involve optical or fluidic system interfaces. Similarly, this invention relates to, and has among its objects, a new family of analog and digital computers, as for example fluidic logic circuits having fluidic optics transduction for recording or readout, flip-flop and NOR gates, and pressure-to-electric switches.

Other objects and features of this invention will be evident from the following disclosure.

The principles of the present invention will be better understood from the following more detailed description taken in conjunction with the accompanying drawings, wherein.

Figure 1:
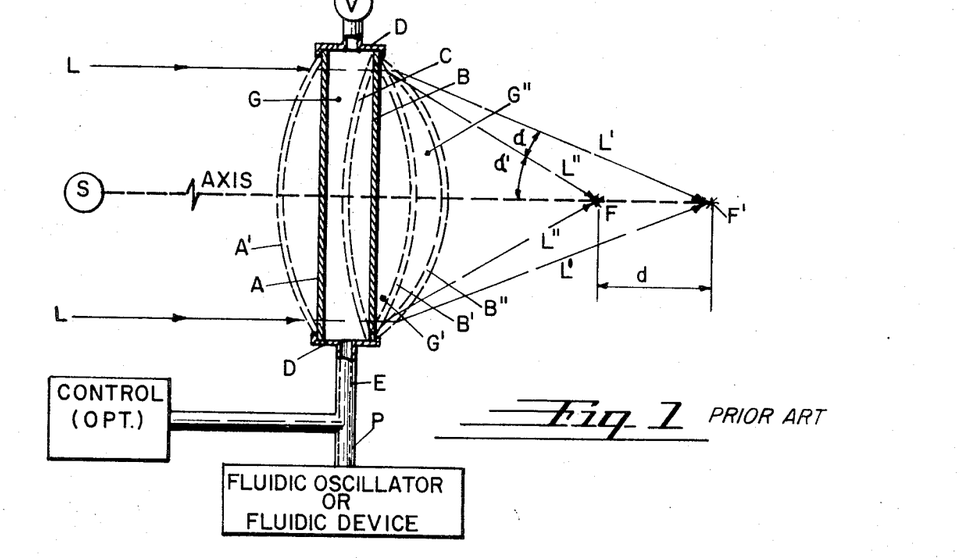
FIG. 1 is a view in side elevation of a fluidic optic module known in the prior art which depicts composite features of various transmission or refractive (lens) and reflection (mirror lens) fluidic optics.

Referring now to FIG. 1, there is shown in side elevation a typical prior art fluidic optic module which depicts in composite form certain features of various refraction or reflection fluidic optics. The arrangement includes two circular windows or diaphragms or face members, A and B, at least one of which is flexible, elastic and resilient. Members A and B are shown as parallel and opposing; and are fluidtight and sealed or otherwise affixed in double drumhead manner at their edges to ring or hoop member D, which is provided with fluidic medium inlet and outlet (optional) conduits E and E', respectively, at the periphery of D.

Alternatively, E and E' may enter through the plate A when A is rigid and B is flexible. A and B may be affixed to D in any convenient manner, as by sealant, clamp, wire hoop or the like. The manner by which A and/or B are affixed to D is usually decided by the form of the fluidic optic, e.g., clamps or the like are preferred when A and/or B are to be replaced after a given period of service.

Thus there is set out in FIG. 1 a drumhead chamber or housing which is filled with a fluidic medium G, as for example a clear refractive liquid. In communication with G via E is a fluidic pressure source, oscillator or device, providing appropriate pressure to form the optic and, as desired, to provide pressure pulses or signals P, and an optional fluidic control, which may be a valving or like means.

This invention envisages and sets forth, cooperant and optically disposed with the fluidic optic module, a light source S and a sensor or recorder (not shown in FIG. 1), as well as filters, stops or other conventional optic elements, the nature of which are detailed hereinafter.

It is now evident from FIG. 1 that a whole family of chromatic refraction and reflection optics is had by (a) varying the nature of members A and B, (b) altering the character of the fluidic medium chambered at G within housing D, and (c) changing the pressure P of the fluidic medium within G relative to ambient pressure or external constraint.

Following are simple examples of fluidic optics obtained by varying general parameters (a), (b) and/or (c), supra, wherein, in FIG. 1, F and F' designate different focal points separated by a distance $d$, with light rays L" and L' traceable back from F and F' through half-angles $\alpha$ and $\alpha'$ which subtend the optical axis:

Planoconvex lens

When member A is a rigid, transparent plate, and B is a thin sheet of transparent, flexible and resilient elastomer, the application of positive pressure P gives a planoconvex lens having infinitely variable curvatures or sphericities B' through B". Accordingly, this converging lens may have an infinite series of chromatic focal points lying along the axis between F and F' and through $d$, depending upon the size and configuration of the fluidic optic module. This fluidic optic, like certain others set out hereinafter, may be pulsed to-and-fro through a given series of chromatic foci by means of signals generated by the fluidic or like device.

E' is an optional outlet or flow through conduit, which is somewhat desirable for many applications of this invention, and which can serve to bleed off air upon the initial loading of chamber G; to serve in such other capacities as a hookup conduit for connecting more than one fluidic optic module in parallel; to carry a pressure-regulating valve; to link with such instrumentation as a manometer (which may have pressure units scaled to lens sphericity, lens-$f$, linear focal length, or the like) or another fluidic device (e.g., to generate a harmonic fluid body response and, hence, frequency multiplication); and, to act as an egress when the chambered liquid also serves as a coolant (e.g., for preventing undue heat buildup and schlieren).

Biconvex lens

When members A and B both are elastic and resilient, plane, transparent sheets, membranes or windows, and a positive P is applied to the liquid within G, then a simple biconvex chromatic fluidic lens is obtained, with faces A' and B' equally flexed when the elastic and flexural and like properties of A and B are the same. Should A or B vary in thickness or diameter or be of different material, then structurally an asymmetric biconvex fluidic lens results, giving in many respects the analogs of such specialty lenses as the periscopic, the hypergon, and the metrogon.

Concavoconvex (meniscus) lens

When transparent member A curves away from the light source S, is of substantially uniform thickness and rigidity, and B is a flexible transparent membrane having its peripheral edges mounted closely to the peripheral edges of A (i.e., with minimal D-width), or sealed immediately to the periphery of A, with E and E' either being flattened to allow for minimal D-width or entering and leaving through say the backside of the edge of A, there results with positive P a converging meniscus chromatic fluidic lens.

Concave-convex lens

But, if, in FIG. 1, the width of D is thickest at the edges, in contrast to the foregoing description of a meniscus lens, a diverging concave-convex chromatic fluidic lens results.

Planoconcave lens

When member A is a plane, rigid, transparent window or face member, and B is a semirigid, P-responding member which curves toward the light source S, the application of pressure pulses P to G gives a planoconcave chromatic fluidic lens.

Biconcave lens

When both A and B members are semirigid but possessing some elasticity, and are mounted such that the dimensional width at D is greater than the thickness or width at the optic axis, and both A and B curve inwardly towards each other, then the application of pressure P to G provides a biconcave chromatic fluidic lens.

Reflective (mirror) lenses and optics

I have constructed and tested a number of reflective mirror lenses and their chromatic modifications. These may be said to fall into three general categories: (a) liquid-filled lenses, one member (e.g., A) of which is reflective (and, as desired, rigid or elastic, plane or nonplanar), and the other member of which (e.g., B) is the transparent pellicle or elastic window member, as hereinbefore described; (b) gas-filled mirror lenses, wherein member B is elastic and reflective (e.g., metallized), and circumferentially affixed to a cuplike or dishlike structure comprising A (usually opaque) and D, with the usual fluidic conduit E; and (c), combinations thereof, which correspond to the series-type or compound fluidic optic described below for FIG. 1C.

Thus, as an illustrative embodiment of this invention in chromatic mirror lens form, in FIG. 1 member A can be a rigid mirror (plane, convex, concave, as desired), to which is affixed at the periphery or via a hoop or ring member D, a roundel of transparent elastomeric sheeting, providing a chamber G, into which liquid can be introduced and pulsed by means of conduit E. The mirror member A can be first or second surface mirror, or both. The application of positive pressure to the liquid loading G results in such mirror lenses as planoconvex (which the member A is plane and rigid), biconvex (when both A and B are elastic), concave-convex (when A is concave and rigid to the right [i.e., towards the foci shown in FIG. 1], and B is elastic), and so on for various other optical configurations.

Alternatively, members A plus D (compare the mirror lens category (b), supra) can comprise a circular dishlike or cuplike structure, to which there is sealed or otherwise affixed (e.g., as by bezel) at the edges a reflective, elastic member B. When negative P is applied to the air or gas contained within G, member B curves inwardly to form a concave mirror lens; P, as is indicated herein, may be pulsed or held relatively static over substantial periods of time. With positive P on the gas loading the converse is had, a convex mirror lens. I have made lenses of this type in special forms, e.g., a mirror lens using a reflective, elastic cellulose acetate replica diffraction grating as member B (ca. $14 \times 10^3$ lines/in.), and have obtained good spectral separation for the visible.

For purposes of clarity and convenience I refer to the foregoing embodiment of my invention as "diffraction modulation." Other forms and kinds of fluidic optical modulation are illustratively set out hereinafter.

With respect to combinations of the above (compare (c), supra), there can be formed a reflection lens of the compound fluidic type, wherein, for example the mirror lens of the kind described above for type (a) [i.e., a mirror member A (rigid) and a flexible, transparent member B, with chamber G loaded with liquid], is provided with a gas-loaded or gas-pressurized and, additionally, possesses a suitably affixed elastic and transparent diaphragm, pellicle or window member. Thus, using A as a rigid, plane mirror to which is sealed a liquid loaded chamber G, the application of positive pressure against B and with respect thereto, by means of a second chamber (see FIG. 1C) or sac facing into and against B, said second chamber having its own fluid conduit, produces a concavity in B, providing a planoconcave mirror lens characterized as having a liquid-loaded face portion. Other variations, especially those taken in conjunction with FIG. 1C, will be apparent to those skilled in the art.

Figure 1A:
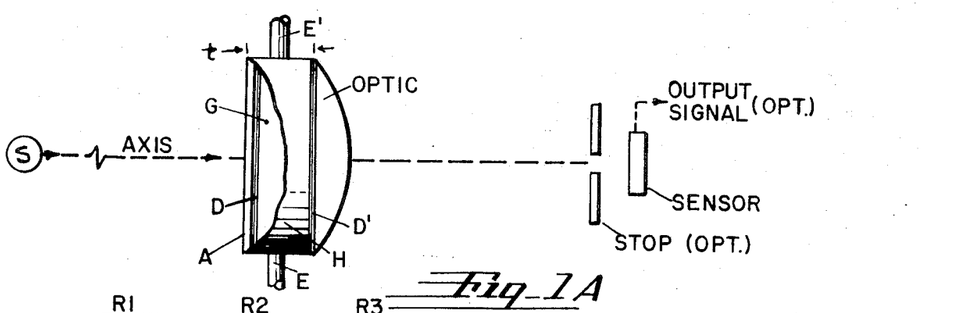
FIG. 1A shows in side elevation a typical modification of a fluidic optic which includes a nonelastic optic together with a light source and a sensor.
Figure 1B:
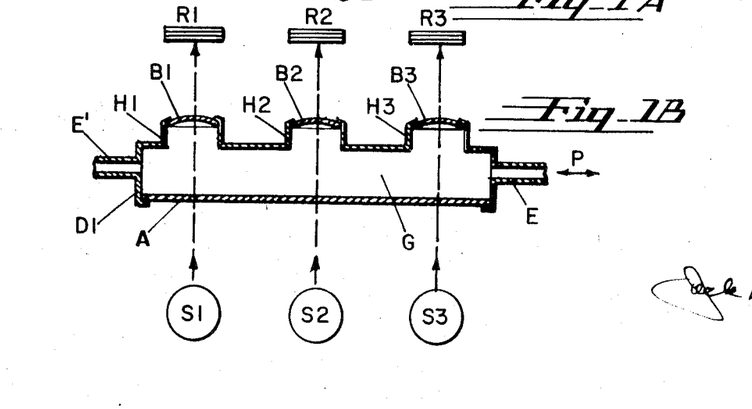
FIG. 1B is a plan view of a multiple or parallel-type fluidic optic.
Figure 1C:
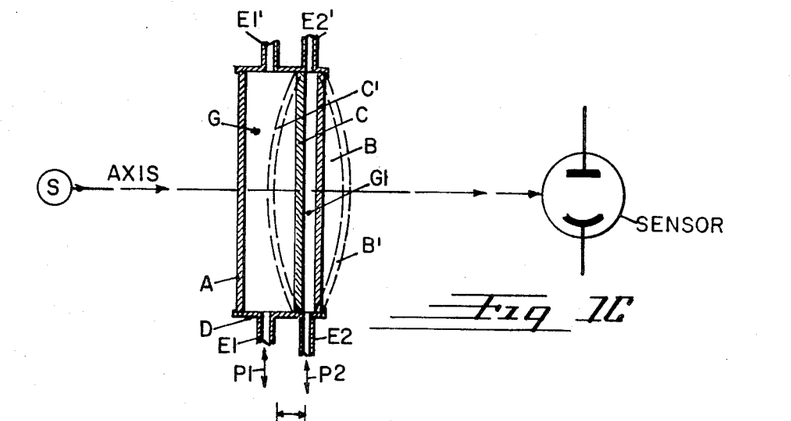
FIG. 1C shows in side elevation a compound or series-type of fluidic optic.

Since chromatic aberration is not shown by reflective surfaces, as is well known in the art, it is necessary in those embodiments and forms of this invention to utilize cooperant or interacting light refraction means to produce chromatic aberration, of which that ensemble depicted in FIG. 1C may be said to be typical.

The disposition of the light source and the sensor, in accordance with customary optical practices, will usually be on the same side, e.g., the source S will be placed at or near the working focal point and the sensor at an appropriate distance out from the mirror lens, or vice versa, depending of course upon the embodiment being utilized. However, for such specialty ensembles as the Schmidt, member A and/or B can be mirrored all but for a transparent window at the center, as desired. As desired, for type (b), supra, member A can be transparent, allowing for additional latitude is the disposition of the fluidic optic cooperantly with the light source and/or the sensor.

In the present disclosure and for purposes of the claims, the term "pressure" is taken to mean either negative or positive pressure, or excursions through a set of pressure values, with respect to (a) the ambient pressure environmental to a fluidic optic, which will usually be atmospheric pressure but which may pressures encountered at sea depths or in outer space, (b) the pressure of a chambered fluidic material necessary to form the optic, or the like.

Referring now to FIG. 1A, there is shown another embodiment of a wavelength-separating fluidic optic. A rigid optic (e.g., lens or mirror) is affixed to the face of a flexible member (e.g., B in FIG. 1), in which case it is of diameter somewhat smaller than that of B; or, as depicted in FIG. 1A, a rigid optic is affixed to or sealed at D' to a ring, collar or hoop member H, which is equipped with a flexible or rigid member A (as in FIG. 1), which may be transmissive or not, according to the form desired. Likewise affixed to D' are E and E' conduits, as previously set out (FIG. 1), with G being the loadable or depressurizable space or housing portion of the fluidic optic. S is a light source, and the optical axis is so designated. Member H is of variable width $t$, depending upon the size and form of the arrangement. H is typically a hoop or drum casing member characterized as elastic and resilient and responsive to positive or negative pressure pulses or signals impressed upon the medium carried within G, which may be liquid or gas. Connected to E is a fluidic device. Set out along the optical axis are an optional stop and a sensor, which may be electrical or nonelectrical in nature.

Further in FIG. 1A: when the rigid optic is of the refraction variety, it may be fabricated of glass, suitable plastic (e.g., methyl methacrylate), fused silica, single-crystal alkali halide, polycrystalline alkaline earth oxides or fluorides, zinc sulfide or selenide, or the like, as may be the case with member A, so as to provide spectral band passes of a specific or special kind.

In FIG. 1A, the width $t$ of H varies with pressure pulses P applied to the fluidic contained in G, causing either (a) linear oscillations 180° or parallel to the optic axis when member H is of uniform linear elasticity and resiliency, or (b) lateral, off-axis or anaxial oscillations with respect to say the focal point of the optic used as a reference out and upon the axis, as when H is not of uniform elasticity (e.g., is thinner) through an arc section. Likewise, $t$ may not be circumferentially the same, the hoop being wider at one section than at say an opposite section.

In FIG. 1B there is shown a typical multiple or parallel-type chromatic fluidic optic. Light sources S1, S2 and S3 communicate via the optic axis with sensors or recorders R1, R2 and R3. In turn, both light sources and sensors are in mutual communication with a multiple fluidic optic having a fluid-charged chamber G, a hoop, sidewall or other fluid-containing structure D1, with inlet and outlet E and E' for fluidic pressure signals P. A is say a plate of flat, clear glass, plastic or the like affixed to the lower edge of D1. B1, B2 and B3 are elastic window or face members analogous to B in FIG. 1. Alternatively, B1, B2 and/or B3 can be rigid optics corresponding to the optic of FIG. 1A, in which instance there is provided linearly or laterally elastic hoop, ring or like mountings H1, H2 and/or H3, being analogous to H in FIG. 1A. Typically, B1, B2 and B3 are circular, and are mounted side by side into a rectangular chamber G having sides and ends formed by D1.

Generally, a parallel wavelength-separating fluidic optic having a common chamber G will exhibit a slight time lapse or phase difference between the reactances of individual wavelength-separating fluidic optic elements. Also, depending upon the size, configuration and spacing of the optics, there may be a sequential dropoff in the reactance of a given optic, usually being the less the more individual optics there are between it and the actuating fluidic device. These provide basic parameters from which to work in terms of time and amplitude, i.e., degree of sphericity, other factors being equal. By the same token, the individual optics comprising the parallel fluidic optic like that of FIG. 1B need not be of the same size, configuration, optical qualities, resiliencies and amplitudes, and the like. Light sources and sensors may be the same or different, as desired.

Alternatively in FIG. 1B, a single light source and/or a single sensor may be optically coupled to one or more of the wavelength-separating fluidic optics by means of a light pipe such as fiber optics (coherent or incoherent). Thus, with a single light source a three-way, branched fiber optic light guide communicates with B1, B2 and B3; and a three-way, branched fiber optic, in turn, picks up the output from the fluidic optics and feeds into a single sensor. When the sensor has an adequate response time, the three slightly out of phase fluidic-to-optical energy signals are picked up in sequence by the one sensor. This sensor can feed into a circuit which discriminates and/or filters on the basis of response time (or interval), light intensity, or the like.

The foregoing exemplifies how fiber optics and like light guides can be employed in the present invention. Since fiber optics conduct light through acute angles, with or without subdivision, and, when of high transmissivity, the output shows little diminution of intensity. Furthermore, fiber optic elements in plate form of say approximately the same diameter as the fluidic optic (or of the entering beam width or of the departing beam width) are sometimes conveniently placed in a fluidic optic system, especially in instances requiring light of a high degree of collimation. This facet of the present disclosure need not be detailed here, for it is well known to those skilled in the art.

In FIG. 1C there is set forth a compound or series type of wavelength-separating fluidic optic. Light source S, optic axis and sensor are as previously described. FIG. 1C is substantially a two-chambered fluidic optic or a two-chambered optic at least one of which chambers or optics is a solid or conventional optic, aligned or optically disposed in communication with each other, so as to modify a light beam in the manner of a compound lens or optical train. In FIG. 1C the compound fluidic optic has chambers G and G1, having in one form fluidic inlet-outlet means E1 and E2 (inlets) and E1' and E2' (outlets) in communication with fluidic media, which may carry different signals P1 and P2 generated by one or more fluidic devices. A is an element which may be a plane window, with B and C the elastic windows forming B' and/or C', according to the pressure or signal differential introduced into chambers G and G1, and as may be decided by the elastic constants of B and C.

Further in FIG. 1C:

For a planoconcave, wavelength-separating fluidic lens chamber G is filled with refractile liquid, whereas chamber G1 is pumped with air or gas at a pressure higher than that of the liquid, i.e., sufficient to form a gas-filled biconvex fluidic optic. The liquid G may or may not be held at static pressure. It is apparent that a planoconcave fluidic lens results, since the biconvex member does not contribute substantially to light beam interaction.

Alternatively, FIG. 1C depicts a doublet of rigid, solid optic G (as of glass, plastic, alkali halide, alkaline earth fluoride or oxide, metallic sulfide and/or selenide (the latter in polycrystalline form, specially suited to optical use) compounded in optical series with a chromatic or wavelength-separating fluidic optic carrying within chamber G1 a liquid of appropriate refractive index. Window A may be dispensed with, as are E1 and E1' and, optionally, so is window C; however, window C can be retained to protect solid optic G from liquid in G1, as in the case of optic materials which are water soluble or attacked by organic or inorganic liquids. Water, oils, glycols and silicones, for example, do not present a problem, as I have found from test.

Alkali halide wavelength-separating fluidic optics are especially suited for the ultraviolet regions, e.g., down to $0.200\mu$. Polycrystalline alkaline earth fluorides and magnesium oxide, also zinc sulfides and selenide, are particularly useful for the infrared region ranging into the $10\mu$–$14\mu$ portion of the spectrum.

The chamber G (as in FIGS. 1 and 1C) and its fluidic loading may be of configuration other than circular, although a flat hoop chamber or drumhead chamber is advantageous for most applications (conventional lenses and mirror lenses are usually discoid). For example, G may be triangular, with E at the base and E' at the apex. Chambers of special configuration have the advantage of altering the oscillatory response characteristics of the fluidic optic, as between linear and nonlinear. Thus, while the fluidic optic is here typically set out as of drumhead or like geometry (e.g., D in FIG. 1 and D1 in FIG. 1B), giving a system which oscillates or resonates in what may be termed a substantially fundamental mode or in linear response to fluidic driving pulsations, it will be evident that modifications of the drumhead or like geometry can provide a nonlinear system.

The bases for such nonlinear systems are well known in sonics, hydraulics and hydrodynamics, and the theoretical aspects need not be detailed here. Suffice to say, however, that a nonlinear fluidic optic has several important end use or performance facets, including geometries calculated to provide antiresonance behavior. These include: (a) the reduction of chamber or fluid body echo, giving a lessened signal-to-noise ratio; (b) the suppression of secondary free oscillations after the first forced oscillation, so as to permit an incoming second forced oscillation to act without undue residual noise caused by rebound free oscillations from the initial pulse, i.e., the prevention of both waveform distortion of a pulse and forced transient vibrations in an elastic member; (c) the production of beats, so as to lower the output frequency of the fluidic optic; and, importantly, (d) the converse which involves harmonic generation, to give frequency multiplication.

Figures 1D, 2, 3, 4:
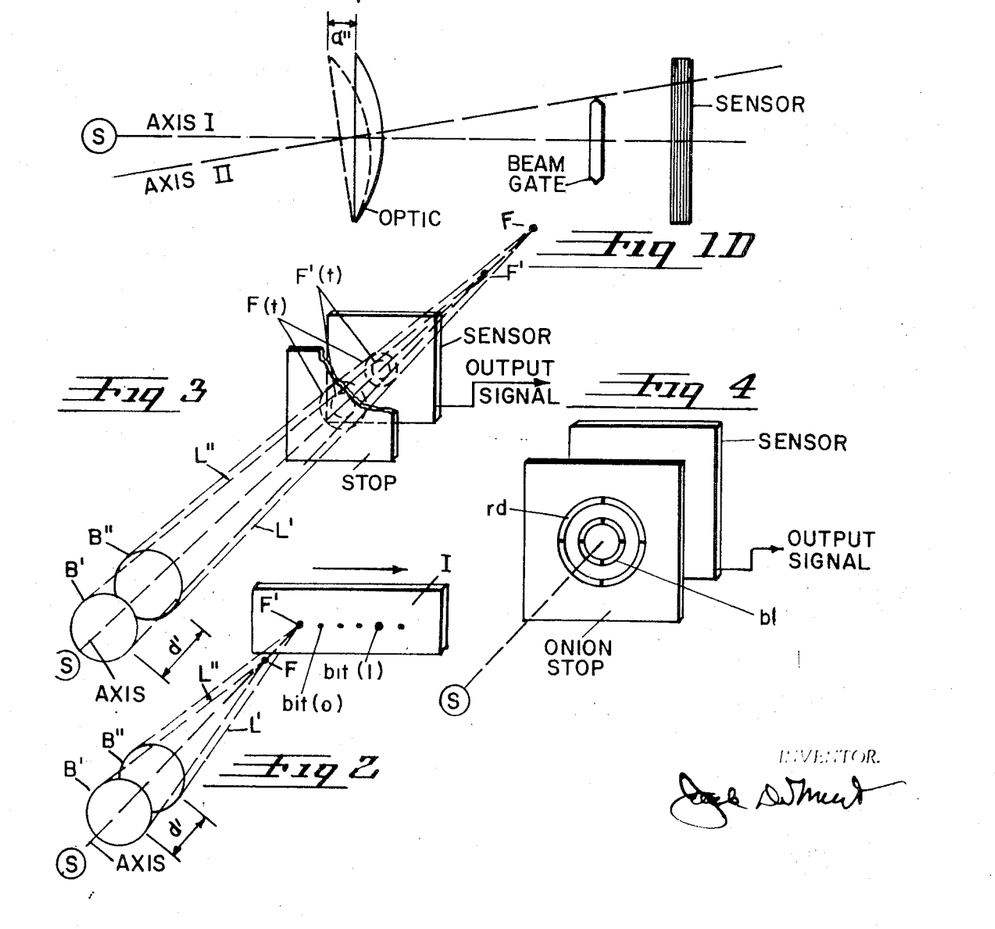
FIG. 1D is a plan view of a fluidic optic system adapted to off-axis or anaxial modulation of a light beam.
FIG. 2 is a perspective view of a fluidic optic adapted to push-pull modulation of a light beam by changing the linear focal length of the light beam.
FIG. 3 is a schematic view in perspective of a fluidic optic adapted to irradiance modulation of a light beam.
FIG. 4 is a schematic view in perspective of a fluidic optic adapted to chromatic modulation.

FIG. 1D is a plan view of a chromatic or wavelength-separating fluidic optic system adapted to off-axis or anaxial light modulation. There is provided a light source S, preferably a gas laser or an injection laser of low beam divergency, a fluidic optic initially mounted say 90° to the optic axis-I, and a knife edge or like beam gate positioned in front of a sensor of say the photoelectronic type. The beam gate acts to cut off a portion of the light which strikes the sensor, giving a tare or rest value for the 90° position. When the fluidic optic oscillates say laterally between axis-I and axis-II, through an angle $\alpha''$, or at least off the 90° positioning to axis-I, more light strikes the sensor and, therefore, there is a larger signal generated by the sensor.

A typical chromatic fluidic optic employed in anaxial modulation is that of FIG. 1A, wherein the hoop member H is say halved, with two semicircular components of different elasticities and resiliencies, or, alternatively, the member H is thinner through a segment of the arc described by H, as in the direction the lateral oscillation is to occur. With a sharp knife edge beam gate and a photoelectronic cell lateral oscillations of less than $10^{-6}$ in. are readily discerned. With more sophisticated photomultiplier ensembles deviations through angle $\alpha''$ corresponding to several to tens of microradians may be measured, depending upon the flexural and like qualities of the fluidic optic. As desired, a field stop may be positioned in front of the beam gate to delimit the periphery of the oscillating beam.

It is evident that this system is readily adapted to such applications as seismometry, vibration and stress analysis and control, edge profilometry (the test specimen is the beam gate), and the like.

FIG. 2 is a schematic view in perspective of a chromatic or wavelength fluidic optic system adapted to light modulation, and useful for the recording of digital data in mass memory processes, punched tape for optical and other computers, and modulation generally. I call this push-pull modulation, involving the to-and-fro impact of the tip of a chromatically aberrated cone or section thereof, of light, upon an electronic sensor or other image-recording means. A chromatic fluidic optic is pulsed through a series of wavelength-separate focal points, some of which upon striking the sensor truncate the light cone at one or more sections down from the apex of the cone, and some of which do not impact or fall short of the sensor, according to the design.

The rationale behind push-pull modulation is understood from FIG. 2, wherein S is a light source such as a suitable gas laser, I is a sensor or image recorder, and B' and B'' represent optical planes of an oscillating wavelength-separating fluidic optic pulsing through a distance $d'$. Thus, a more spheric or curved fluidic optic at one instant in its pulsation life will chromatically focus at F (and hence not impact I), and at another instant in its pulsation cycle into a less curved optic will differently focus at F' (and hence impact the sensor I); L'' and L' are the converging rays making up the chromatically aberrated or wavelength-separated cone(s) as the optic pulsates between F and F'. Now, say just the tip of the aberrated light cone strikes the sensor, giving in the case of photosensitive or recording means (and moving sensor or means, as shown by the arrow), a small image or "dot" recording, bit (0). However, when the light cone focuses beyond F' and the light cone is truncated somewhere below the apex or tip of the cone, then a larger aberrated image or "dot," bit (1), is formed.

While there is shown in FIG. 2 a recording medium I which moves translationally, it is evident that variations of both recording means (or sensor) and direction of motion can be utilized. Thus, a circular disk of photosensitive, burnable or like nature, spun gradually off its center, so as to give a spiral or helical train of bits of data can be used.

When I is an electronic sensor it may be either fixed or moving (translational or rotational), the output signals corresponding in magnitude to either bit (0) or bit (1). In this version the electronic sensor feeds into a discriminating circuit, usually with some prior or subsequent amplification. Such circuitry is well known in the art.

FIG. 3 represents another wavelength-separating kind of light modulation and information producing system, being in certain respects not unlike that depicted in FIG. 2. FIG. 3 shows what I term irradiance modulation, comprising say a fixed electronic sensor, which has an output signal, positioned behind a field stop. As in FIG. 2, the fluidic optic provided with a light source S, say a laser, pulsates infinitely between optical planes B' and B'' and through an arbitrarily shown distance $d'$, giving converging light rays L' and L''. The variously elongated and aberrated light cone thus produced is variously truncated in sections below F', as at $F(t)$ and $F'(t)$. Thus, the irradiance delivered to the sensor can be made to sequence through a very large series of photometric values, giving output signals which correspond to the sensed irradiances as they may be passed or blocked by the stop.

Whereas FIG. 3 shows an open stop, the converse can be used; that is, an opaque roundel or disk stop. Such a system may be desirable when substantial light fields must be matched with the photosensitive area of the sensor for enhanced discrimination in sensed irradiance.

Referring now to FIG. 4, there is set forth the basics of a light modulation system called chromatic modulation. The oscillating cones of light from a pulsating fluidic optic are not shown, and for these reference is made back to FIGS. 2 and 3. Otherwise, in FIG. 4 there is shown a light source S, preferably a white light source or a laser (e.g., gas laser) emitting in at least two different portions of the spectrum (since, by definition, at least two different wavelengths are necessary for chromatic modulation), which wavelengths are preferably widely spaced from one another. Before say an electronic sensor, which may be responsive to either or both of the wavelengths, there is positioned an "onion stop." This is typically a stop having concentrically spaced circular or arced apertures, as shown in FIG. 4. The two arc sections shown in FIG. 4 are designated bl (for blue or short wavelength) and rd (for red or long wavelength).

It is thus seen from FIG. 4 that a pulsing fluidic optic (compare FIGS. 2 and 3, and the previous explanations) will, by its inherent or built-in (as by containing highly dispersive liquid), by chromatic aberration, throw bl-light and/or rd-light, or shorter and longer wavelengths, as the case may be, into and out of the circular or arced apertures comprising the onion stop and, hence, onto or not onto the sensor. Since the sensor output signal corresponds to a "yes-or-no" or "on-off" language, the chromatic modulation system is utilizable for binary coding and programming.

Figure 5:
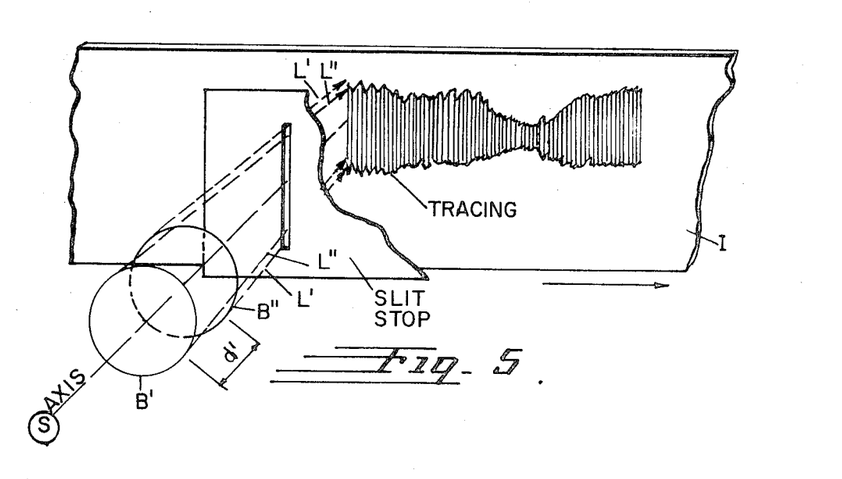
FIG. 5 is a schematic view in perspective of a fluidic optic light modulation arrangement which incorporates certain features shown in FIGS. 2 and 3.

FIG. 5 is a schematic view in perspective of a slit-stop modulation system, being not unlike the push-pull modulation ensemble shown in FIGS. 2 and 3, but in this case adapted to the vertical tracing of fluidic optic signals. As in the previous figures, the elements are substantially the same, except that there is placed a slit-stop before say a laterally moving photosensitive tape, film or like recording medium. When the optic is in a long focus mode during its oscillation the upper and lower ends of the slit demarcate the tracing, but when the fluidic optic is in a short focus mode there is a foreshortening of the tracings. The long focus mode is represented in FIG. 5 by ray L', and the short focus mode by ray L''. The slit-stop arrangement is adapted to recording data or fluidic device signals at say a low rate, where a permanent photographic or like type of record is desired.

The arrangement set out in FIG. 5, like the preceding modulation systems (especially those of FIGS. 1B and 4, where a great number of variables may be introduced into the modulation record), would appear to be particularly promising for certain cryptographic and related applications involving code or cipher (as contrasted to systems depending upon finely resolved images).

For purposes of orientation and generally for the aid of those skilled in the art, a fluidic optic loaded with a refractile liquid may be looked upon as either of two kinds of hydraulic systems in which oscillations, waves, pulsations, vibrations, or the like transmit power. The two systems are:

1. Alternating flow hydraulic systems which deliver oscillatory power by uniform, alternating movement of the chambered liquid, which is driven by the fluidic oscillator or other fluidic actuating device. The latter includes various mechanical and electromechanical pumps and reversing valve arrangements, well known in the art. Because of the inherent performance characteristics of the latter and the lossiness from an initial pulse to a final optic vibration, these may be limited to frequencies of the order of less than several hundred hertz (providing, nonetheless, process control, certain "slow" data-processing, and infrasonic transduction applications, for example). These and similar systems can be made to drive a fluidic optic at exceedingly low rates, e.g., through a full expansion and relaxation cycle in a matter of minutes or hours or days, as desired, and providing a particular area of applications (as in warning and signaling devices for fluidic amplifiers, pressure systems (including gases), and the like). However, with more sophisticated and refined fluidic optic systems incorporating small and precisely designed and operating fluidic devices, frequencies into the several kilohertz can be had.

2. The second driving or actuating system is termed "pulse hydraulics" in the art, because it transmits pressure pulses with no gross movement of the liquid comprising the fluidic optic. Fluidic drivers include, in addition to certain fluidic devices described subsequently, piezoelectric, moving coil, electroacoustic and electromagnetic, and variable reluctance actuators. The frequencies may range quite widely, depending upon size and performance characteristics, as for example generally downward from several hundreds of kilohertz.

Fluidic devices are presently classified into (a) active elements and (b) passive elements:

The active fluidic devices require a separate power supply because they produce gain; these are of two basic kinds, digital and proportional. In the digital device the output varies between discrete energy levels, as determined by the control signal; these are also called logic elements because they can perform logic functions. Examples are: wall attachment, induction, edge tone, diverter, and turbulence. In the proportional fluidic devices the output of a proportional amplifier has a continuous range of values since it varies proportionally with the input signal. Examples are: stream interaction, vortex, direct and impact modulators. Usually the various types of fluidic devices can be interconnected.

The passive fluidic circuit devices, on the other hand, do not require a separate power supply since they produce no gain. In passive elements, mass flow is the analog of current, and pressure is the analog of voltage. Examples are: resistors, inductors, capacitors, delay lines, filters, and fluidic diodes.

Fluidic devices coupled with fluidic optics can usually operate under adverse environments. A wide variety of fluids and structural materials are available for fabrication. Operation can be reliable in extreme electromagnetic or corpuscular radiation fields for periods of several orders of magnitude longer than conventional electronic devices. Radiation pulses, e.g., from nuclear detonations and reactors, usually do not impede the performance of a properly designed fluidic device system. Fluidic devices can be isolated from the fluidic optic(s) by means of an appropriate umbilical and use of housings, to enable service under various temperature gradients, vibration and shock. Multifurcated fiber optics, shock mountings, anechoic housings, and the like, all can serve to maintain the integrity of such an isolation. For fluidic devices, as is generally the case with fluidic optics, the absence of moving mechanical parts offers the potential of high reliability, while simplicity is consonant with low cost.

The number of liquids potentially available for loading fluidic optics is literally immense. These include both inorganic and organic liquids, as well as various solutions. The salient properties include refractive index, chemical and physical stability, viscosity, elastomeric compatibility, density and vapor pressure, spectral transmissivity, and the like. Examples (with refractive indices referred to the NaD line [this, of course, will vary with the particular portion of the spectrum being worked]) include: water (1.33), various glycols (1.4), oils (1.5–1.6), halogenated naphthalenes and other polycyclics (1.6), methylene iodide (1.74), and solutions of various substances in methylene iodide (1.79–1.96). In special versions of a fluidic optic it may be desirable to utilize liquid at an elevated temperature, or an otherwise corrosive or reactive liquid, e.g., fluorides and chlorides of silicon, titanium, tin.

The elastomeric element (e.g., A and/or B in FIG. 1), which may be of the transmission or reflection type, can, as desired for special forms of this invention, comprise: (a) a flexible, stretchable diffraction grating (for the ultraviolet, visible or infrared portions of the spectrum); (b) a reticule or graticule or other scale or reference grid or the like; (c) an antireflection coating; (d) a polarizing component, as of the Polaroid type or polacoat type; (e) a hologram. The latter is of special interest in that an elastic hologram is provided; this is seen to be a series of holograms which, for example, are disposed concentrically or as a series of annuli, each of the "ring holograms" corresponding to a given sphericity or focus of the fluidic optic to provide, in turn, upon projection and reimaging (image reconstruction, as by laser) a series of holographic images as the fluidic optic sequences through different sphericities or foci (note, also, that for example, each circular or annulus hologram may be designed to respond to a particular visible or extravisible portion of the spectrum, only; such band passes are had by use of dichroic filters).

Other special versions include leaving a transparent window of plastic substrate in the center of a reflective elastic mirror lens, to enable a fluidic optic to be obtained in Schmidt, Bouwers-Maksutor, or like embodiment. Also, a specialty type of lens can be had, as exemplified by mirroring either A or B member in FIG. 1 (on either or both surfaces) and loading the system with refractile liquid, so as to produce either a planoconvex or biconvex reflection-refraction fluidic optic. The light source is conventionally disposed with the optic, as in front of the reflective surface having compounded thereupon a refraction optic.

Herein, the terms "sensor" and "recorder" and like means in communication with a fluidic optic are taken to be broadly equivalent. The human eye included, these may be electronic or nonelectronic. Many light sensors and light-recording devices and methods and means are well known. The choice of a particular sensor will usually depend upon the particular form this invention takes, including a consideration of the region of the spectrum being worked, and such choices are well within the capability of those skilled in the art. Auxiliary circuitry and the like may be chosen from the conventional electronics art, according to readout in terms of final signal, recording, image, or the like.

The electronic and like sensors include photocells (e.g., photoemissive, photoconductive, photovoltaic), thermopiles, thermistors, radiometers, bolometers, pyrometers, photomultiplier tubes, and the like. The choice of a given sensor is decided by, among other things, the spectral range involved, light flux, sensitivity, and adaptability to amplification or subsequent readout upon an oscilliscope, tracing machine or strip recorder, or the like. Image intensifiers are especially useful at very low irradiances or when the visualization of a weakly fluctuating light spot or other light pattern (visible or extravisible) is required.

The nonelectronic and like sensors and recorders include photographic emulsions (halide and nonhalide, black and white and color, also spectrally specific, e.g., color infrared film), photochromic and thermochromic agents (as in screen form), fluorescent and thermoluminescent and infrared-sensitive phosphor screens, and the like. Punchable, burnable and like paper or plastic or other paper in tape or disk form have already been mentioned.

For purposes of this disclosure the continuous or pulsed light source is taken to mean coherent as well as incoherent light sources characterized as generating wavelengths lying in the ultraviolet, visible and/or the infrared portions of the spectrum. The incoherent light sources are many and well known, and include filament bulbs, gas and vapor discharge lamps (e.g., alkali and heavy metal, metalloid, the noble gases, and the like), and incandescent or candeluminescent sources (e.g., the zirconia arc), also specialty light sources such as electric arcs, sparks, exploding wires, doped flames, excited phosphors, shocked gases, and the like. Light incident to chemical and nuclear explosions, also rocket or other propellant systems, are of interest in connection with military applications of the present invention.

Fluidic optics qualities such as weight, size and cost are unique as compared to the similar qualities of glass optics; this is particularly true for the more conventional optics designed to operate in the extravisual portions of the spectrum. For example: the weight saving over glass can range between 2.4–2.8 (ordinary optical glasses) and 3–6 (heavy flint and rare earth glasses). Fluidic optics can range in sizes between a few millimeters and several meters in diameter. A conventional ultraviolet lens of say half a meter diameter is extremely costly and, for the short ultraviolet, apparently not yet attained. Because of their low cost, fluidic optics can be one-shot, destruct elements in work involving exceedingly high mechanical or electromagnetic energy fields. Performance can be had over temperature ranges of say −65° to +425° F. by means of appropriate liquid loadings (e.g., pyrazine base fluids, high phenyl and fluorinated silicones, and trimethylolpropane esters), and the use of improved or composite elastomers (certain of these are flexible to −250° F.).

Finally, while I have endeavored to provide theoretical explanations, I do not wish to be bound by these, should they prove to be not altogether correct.

I claim:

1. The method of refractively changing by chromatic aberration the path of a beam of light characterized as containing at least two different wavelengths which comprises the steps of:
   a. placing two discs at least one of which is transparent in optical apposition, at least one of the said discs being flexible, and affixing the two said discs together at their edges so as to provide a fluidtight chamber encased by the two discs;
   b. connecting a fluid conduit to the said chamber;
   c. filling the said chamber with a transparent fluid;
   d. coupling pressure means to the said fluid conduit and to the said transparent fluid;
   e. actuating the said pressure means and transmitting pressure to the said fluid within the chamber, whereby to flex the said flexible disc through an arc section;
   f. passing a beam of light characterized as containing at least two different wavelengths into the said chamber and the encased fluid, whereby to refractively change by chromatic aberration the path of the said beam of light;
   g. and sensing a portion of the refractively changed beam of light by placing a light sensor in optical communication with the said portion of light.

2. The method set out in claim 1 wherein the said fluid is a gas.

3. The method set out in claim 1 wherein the said fluid is a liquid.

4. The method of sensing a portion of a beam of multiwavelength light characterized as lying in the ultraviolet, visible or infrared spectrum which comprises the steps of:
   a. generating a multiwavelength beam of light;
   b. placing the said beam of light in optical communication with a chamber having two transparent windows characterized as sharing a common optical axis, at least one of the said windows being elastic and resilient;
   c. filling the said chamber with a liquid transparent to the said beam of light;
   d. applying pressure pulsations to the said liquid such that the said elastic and resilient window is flexed by the said pressure pulsations, whereby to change the sphericity of the said window;
   e. refracting the said beam of light by passing the beam of light through the said liquid and the said windows, whereby to separate by chromatic aberration the said multiwavelength beam of light;
   f. and sensing a portion of the said separated multiwavelength beam of light by placing a light sensor in optical communication with the said portion of separated light.

5. The method of sensing a portion of a beam of multiwavelength light characterized as lying in the ultraviolet, visible or infrared spectrum which comprises the steps of:
   a. generating a multiwavelength beam of light;
   b. placing the said beam of light in optical communication with a chamber having two diaphragm members characterized as sharing a common optical axis, one of the said diaphragm members being reflective and the other of the said diaphragm members being transparent, at least one of the said diaphragm members being elastic and resilient;
   c. filling the said chamber with a fluidic material;
   d. applying pressure pulsations to the said fluidic material such that the elastic and resilient diaphragm member is flexed by the said pressure pulsations, whereby to change the sphericity of the said diaphragm member;
   e. reflecting the said beam of light by passing the beam of light through the said transparent diaphragm member and onto the said reflective diaphragm member, whereby to separate by chromatic aberration the said multiwavelength beam of light;
   f. and sensing a portion of the said separated multiwavelength beam of light by placing a light sensor in optical communication with the said portion of separated light.

6. The method of sensing a portion of a beam of multiwavelength light characterized as lying in the ultraviolet, visible or infrared spectrum which comprises the steps of:
   a. generating a multiwavelength beam of light;
   b. placing the said beam of light in optical communication with a chamber having two diaphragm members characterized as sharing a common optical axis, at least one of the said diaphragm members being reflective, elastic and resilient;

c. filling the said chamber with fluidic material;
d. applying pressure pulsations to the said fluidic material such that the elastic and resilient diaphragm member is flexed by the said pressure pulsations, whereby to change the sphericity of the said reflective diaphragm member;
e. reflecting the said beam of light by passing the light through the chamber and onto the said reflective diaphragm member, whereby to separate by chromatic aberration the said multiwavelength beam of light;
f. and sensing a portion of the said separated multiwavelength beam of light by placing a light sensor in optical communication with the said portion of separated light.

7. The method of modulating a beam of light which comprises the steps of: generating a beam of light characterized as containing at least two different wavelengths; optically coupling the said beam of light with an elastic lens; oscillating the said elastic lens through a sequence of oscillatory modes; passing the said beam of light into the said lens during the oscillation thereof, whereby to variously refract the said beam of light through a series of refractions corresponding to the said oscillatory modes; passing the said beam of light after the said refractions through a stop characterized as parting by chromatic aberration the said at least two different wavelengths; and incidenting the said light subsequent to the said parting upon a sensor, whereby the said sensor receives the said wavelengths through a sequence of time intervals corresponding to the said oscillations of the variously refracted light.

8. The method set out in claim 7 wherein the said elastic lens includes an elastic diffraction grating optically coupled to the said sensor.

9. The method set out in claim 7 wherein the said elastic lens includes an elastic and deformable image optically coupled to the said sensor.

10. The method set out in claim 7 wherein the said elastic lens includes an elastic and deformable light-polarizing member optically coupled to the said sensor.

11. The method set out in claim 7 wherein the said elastic lens includes an elastic hologram optically coupled to the said sensor.

12. A combination in an information-processing system of the optically coupled ensemble which comprises:
a. an elastic optic characterized as having chromatic aberration;
b. an information-generating means for oscillating the said elastic optic, the said means being in communication with the elastic optic;
c. a light source generating light of at least two different wavelengths;
d. a sensor optically coupled to the said elastic optic;
e. and light-delimiting means aligned between the said elastic optic and the said sensor characterized as parting by chromatic aberration at least one of the said wavelengths generated by the said light source; whereby the said sensor receives at least one of the said wavelengths through a sequence of time intervals corresponding to the oscillations of the elastic optic.

13. The method of modulating a beam of light which comprises the steps of:
a. generating a beam of light characterized as containing at least two different wavelengths;
b. optically coupling the said beam of light with a fluidic optic characterized as having chromatic aberration;
c. oscillating the said fluidic optic through a sequence of oscillatory modes;
d. passing the said beam of light through the said fluidic optic during the oscillation thereof, whereby to separate by chromatic aberration the said different wavelengths present in the said beam of light;
e. passing the said separated wavelengths through a stop characterized as passing one of the said wavelengths and concurrently blocking the other of the wavelengths during the said oscillatory mode;
f. incidenting one of the said wavelengths upon a sensor;
g. and producing in the said sensor a train of responses corresponding to the said separated wavelengths and the said sequence of oscillatory modes of the fluidic optic, whereby to modulate the said generated beam of light.

14. The method set out in claim 13 wherein the said beam of light is coherent.

15. The method set out in claim 13 wherein the said fluidic optic is a transmission optic.

16. The method set out in claim 13 wherein the said fluidic optic is a reflection optic.

17. The method of modulating a beam of light which comprises the steps of: generating a beam of light characterized as containing at least two different wavelengths; optically coupling the said beam of light with an elastic mirror lens; oscillating the said elastic mirror lens through a sequence of oscillatory modes; passing the said beam of light into the said lens during the oscillation thereof, whereby to variously reflect with a concurrent refraction the said beam of light through a series of reflected refractions corresponding to the said oscillatory mode; passing the said beam of light after the said refractions through a stop characterized as parting by chromatic aberration the said at least two different wavelengths; and incidenting the said light subsequent to the said parting upon a sensor, whereby the said sensor receives the said wavelengths through a sequence of time intervals corresponding to the said oscillations of the variously refracted light.

18. The method set out in claim 17 wherein the said elastic mirror lens includes an elastic hologram optically coupled to the said sensor.

19. The method set out in claim 17 wherein the said elastic mirror lens includes an elastic diffraction grating optically coupled to the said sensor.

20. The method set out in claim 17 wherein the said elastic mirror lens includes an elastic and deformable image optically coupled to the said sensor.

21. The method set out in claim 17 wherein the said elastic mirror lens includes an elastic and deformable light-polarizing member optically coupled to the said sensor.

22. The method of modulating a beam of light which comprises the steps of:
a. generating a beam of light characterized as containing at least two different wavelengths;
b. optically coupling the said beam of light with an elastic mirror lens characterized as having chromatic aberration;
c. oscillating the said elastic mirror lens through a sequence of oscillatory modes;
d. passing the said beam of light into the said elastic mirror lens during the oscillation thereof, whereby to variously refract the said beam of light through a series of refractions corresponding to the oscillations of the said elastic mirror lens and separate by chromatic aberration the said different wavelengths present in the said beam of light;
e. passing the said separated wavelengths through a stop characterized as passing one of the said wavelengths and concurrently blocking the other of the wavelengths during the said oscillatory mode;
f. incidenting one of the said wavelengths upon a sensor;
g. and producing in the said sensor a train of responses corresponding to the said separated wavelengths and the said sequence of oscillatory modes of the elastic mirror lens, whereby to modulate the said generated beam of light.

* * * * *